United States Patent

Waddle

[15] 3,684,060
[45] Aug. 15, 1972

[54] WHEEL CHOCK
[72] Inventor: James B. Waddle, Decatur, Ga.
[73] Assignee: Power Parts Company
[22] Filed: Oct. 12, 1970
[21] Appl. No.: 80,010

[52] U.S. Cl. .................................. 188/36, 188/32
[51] Int. Cl. .................................................. B61h 7/02
[58] Field of Search .................................. 188/32, 36

[56] References Cited

UNITED STATES PATENTS

| | | | |
|---|---|---|---|
| 2,850,117 | 9/1958 | Gersmehl | 188/32 |
| 3,258,088 | 6/1966 | Bowen | 188/32 |
| 3,391,760 | 7/1968 | Gonser | 188/32 |

Primary Examiner—Duane A. Reger
Attorney—Lettvin and Gerstman

[57] ABSTRACT

A wheel chock for engaging opposite sides of a wheel to prevent rolling in either direction is provided by a pair of spaced wedge-like blocks that are secured together in pre-spaced relation by a hoop-like bar of resilient steel that operates to maintain the blocks in position while permitting flexing of the hoop to effect removal of the blocks from opposite sides of a wheel.

3 Claims, 3 Drawing Figures

PATENTED AUG 15 1972 3,684,060

INVENTOR
James B. Waddle
BY Settvin & Gerstman
ATTORNEYS

WHEEL CHOCK

BACKGROUND OF THE INVENTION

This invention relates to a wheel chock, and more particularly, to a chock for use with the wheel of a railway car, or the like, and is used to prevent cars from rolling in either direction.

Hand brakes frequently are not adequate to hold railway cars at selected locations along a track, particularly if the car is parked on any appreciable decline. It has been known that the compressed air for air-operated brakes frequently bleeds off from a braking system when railway cars are parked in a braked condition for any length of time. It is, of course, well known to use wedge-type wheel blocks to prevent railway cars from rolling in either direction along a track, such as may be caused by failure of the brakes to hold the car at a selected position along the track.

The object of this invention is to provide a simple and inexpensive, but easy to handle, wheel chock that is constructed and arranged to engage opposite sides of a wheel of a rail car or the like, to prevent the car from rolling in either direction.

Another object of the invention is to provide a wheel chock which may be readily handled and manipulated, to either effect insertion of the blocks beneath a wheel or to remove the blocks from beneath a wheel with minimum effort and in an efficient and effective manner.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing.

DESCRIPTION OF THE PREFERRED EMBODIMENT

Figure 1:
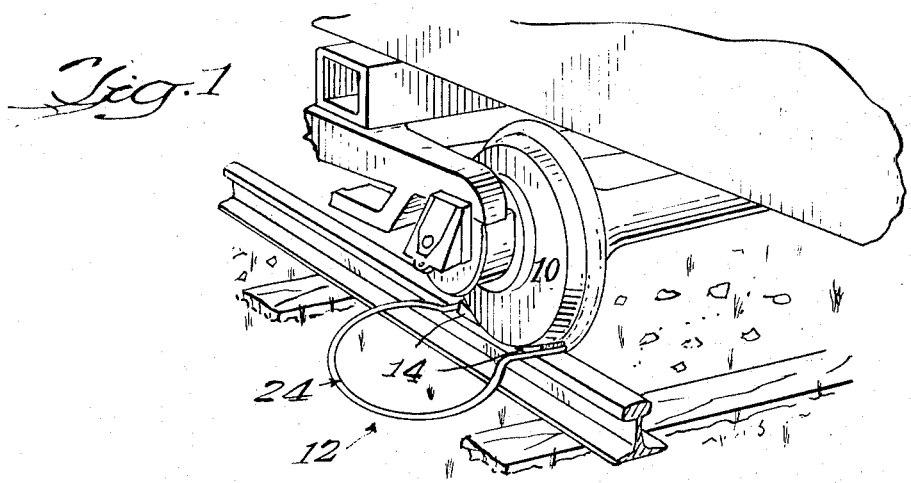
FIG. 1 illustrates a fragment of a railway car showing a wheel thereof with the wheel chock of this invention applied in position with respect to the wheel of the car.

Referring now to the drawing, FIG. 1 illustrates a fragment of a railway car showing a wheel 10 on its track and with the chock 12 of this invention applied to the wheel. The details of the wheel chock 12 are most clearly seen in FIGS. 2 and 3.

The wheel chock 12 includes a pair of generally wedge-shaped blocks 14 arranged and spaced in mirror-image relation to each other. These blocks 14 are adapted to engage opposite sides of the lowest point of the wheel 10, as seen in FIG. 1. Each block 14 has a flat lower side 16 that is adapted to lie against a support surface, such as the top side of a rail, and a curved upper side 18 that serves as a wheel-engaging surface. The curve of the upper side 18 is to a radius that is substantially identical to the radius of the wheel that is to be chocked. Typically, the radius of curvature of upper side 18 may be a 20 inch radius.

The sides 16 and 18 join the inwardly facing tapered edge 20 of the block. The opposite edge of block 14 provides an upright side 22 which intersects at its upper edge with the upper side 18 to define the highest point that is most distant from the side 16.

Figure 2:
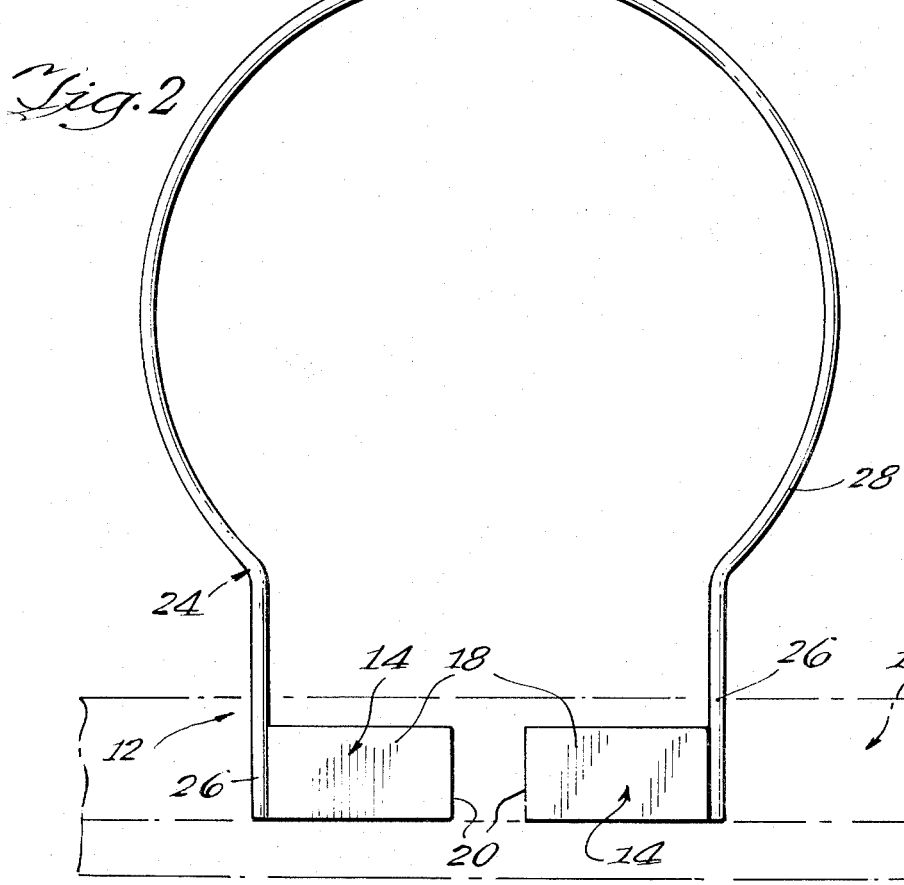
FIG. 2 is a top plan view of the wheel chock.
Figure 3:
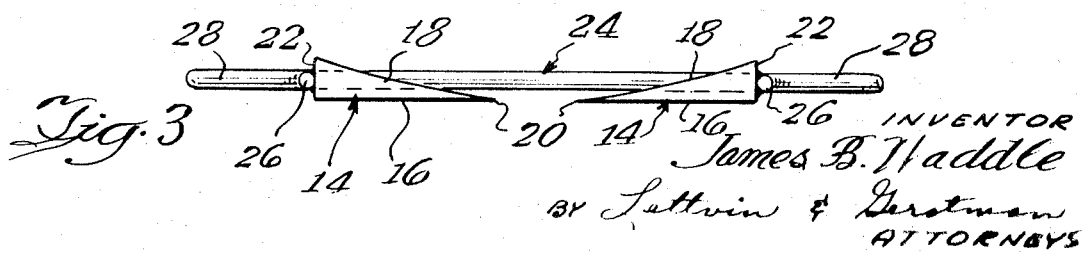
FIG. 3 is an elevational view of the wheel chock of FIG. 2 taken substantially on line 3—3 of FIG. 2.

The blocks 14 are arranged with their tapered edges 20 facing each other and spaced sufficiently close to each other to serve as blocks for opposite sides of the wheel to be chocked. A frame, generally indicated at 24, is rigidly secured to each of the blocks 14 to provide a unitary chock member. The frame member 24 is of resilient material and has a shape that when unstressed, as seen in FIG. 2, operates to maintain the blocks 14 spaced from each other in position for an operative relation with the wheel to be chocked. The frame member 24 is flexible enough to permit further resilient separation of the adjacent tapered edges of the block so as to accommodate ready insertion or removal of the blocks 14 on opposite sides of a wheel. More specifically, the frame member 24 is in the shape of a formed bar of spring steel that has been tempered so that it will restore itself to the condition seen in FIG. 2 after it has been stressed so as to separate the blocks 14. In the preferred form, the bar-like frame member 24 is formed of round stock that is shaped to provide two spaced parallel, elongated, securement ears 26 that are welded adjacent one end thereof to the upright rear wall 22 of the blocks 14. The ears 26 secure to upright side 22 intermediate the edges thereof so as to locate frame member 24 in a plane that is spaced between the plane of the block's flat sides 16 and a plane through the uppermost portions of the block. Such a spacial arrangement is best seen in FIG. 3.

The other end of each of the securement ears 26 merges and thereby connects with the ends of a hoop-like segment 28. The hoop-like segment 28 is generally circular and has an arcuate extent that is in the range of approximately 270°. This locates the parallel securement ears 26 at a spacing that is less than the diameter of the hoop segment 28. The arrangement of the hoop member 28 of greater diameter than the spacing of the securement ears 26 permits of flexing of the hoop 28 so as to spread the blocks 14 a sufficient distance to clear the wheel that is being chocked without springing the hoop 28 and so that the inherent resilience of the tempered steel hoop operates as a spring to restore the chock to the normal position seen in FIG. 2.

This wheel chock is applicable in any situation where freight cars or locomotives are parked whether it be in a yard, or an industrial siding, or a spur or enginehouse. The wheel blocks 14 may be readily seen by a brakeman by reason of being colored a bright orange or yellow.

An important feature is having the upper side 18 of the block 14 concavely curved to a radius substantially equal to the radius of the wheel that it cooperates with. Ordinary wedge-shaped blocks with a flat, but inclined, upper surface do not provide as great a resistance to the wheel rolling upwardly thereof as may be achieved with a block, such as disclosed herein, having an upper surface curved to a shape substantially complementary to the wheel.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A wheel chock comprising, in combination, a pair of generally wedge-shaped blocks arranged in spaced, mirror image, relation to each other with the tapered edges of the blocks facing each other and spaced sufficiently close to each other to serve as blocks for opposite sides of a wheel, a frame member of resilient material secured to said pair of blocks, the frame member having a shape that when unstressed operates to maintain the blocks spaced from each other in position for operative relation with a wheel but being flexible enough to permit further resilient separation of the blocks to accommodate ready insertion or removal of the blocks on opposite sides of a wheel, the frame member being of a formed bar shape that provides two spaced, parallel, elongated securement ears each connected at one end thereof to one of the blocks and merging at the other end with a hoop-like segment that resiliently permits spreading of the securement ears, and the hoop-like segment being generally circular and having an arcuate extent in the range of about 270°, so that the diameter of the hoop-like segment is greater than the spacing of the two securement ears.

2. A wheel chock as in claim 1 wherein the blocks are each formed with a flat lower side adapted to engage a support surface and a wheel-engaging surface that is curved to a radius substantially identical to the radius of a wheel that is to be chocked, the said two surfaces joining at the tapered edge of the block, the edge of each block opposite the tapered edge being engaged by and secured to the frame member.

3. A wheel chock as in claim 2 wherein the frame member is of a formed bar shape arranged to lie substantially in a plane that is spaced between the plane of the flat lower sides of the blocks and a plane through the uppermost outer portions of the blocks.

* * * * *